США008799804B2

(12) United States Patent
Aravamudan

(10) Patent No.: US 8,799,804 B2
(45) Date of Patent: *Aug. 5, 2014

(54) METHODS AND SYSTEMS FOR A LINEAR CHARACTER SELECTION DISPLAY INTERFACE FOR AMBIGUOUS TEXT INPUT

(75) Inventor: Murali Aravamudan, Windham, NH (US)

(73) Assignee: Veveo, Inc., Andover, MA (US)

( * ) Notice: Subject to any disclaimer, the term of this patent is extended or adjusted under 35 U.S.C. 154(b) by 664 days.

This patent is subject to a terminal disclaimer.

(21) Appl. No.: 13/078,540

(22) Filed: Apr. 1, 2011

(65) Prior Publication Data

US 2011/0185306 A1    Jul. 28, 2011

Related U.S. Application Data

(63) Continuation of application No. 11/862,917, filed on Sep. 27, 2007, now Pat. No. 7,925,986.

(60) Provisional application No. 60/828,519, filed on Oct. 6, 2006.

(51) Int. Cl.
*G06F 15/00* (2006.01)
*G06F 13/00* (2006.01)
*G06F 3/023* (2006.01)

(52) U.S. Cl.
CPC ............ *G06F 3/0233* (2013.01); *G06F 3/0238* (2013.01)
USPC ......................................... 715/773; 715/854

(58) Field of Classification Search
CPC .............................. G06F 3/0233; G06F 3/0236
USPC .......... 715/771–773, 810–811, 816, 851–854
See application file for complete search history.

(56) References Cited

U.S. PATENT DOCUMENTS

| 1,261,167 A | 4/1918 | Russell |
| 4,453,217 A | 6/1984 | Boivie |

(Continued)

FOREIGN PATENT DOCUMENTS

| EP | 181058 | 5/1986 |
| EP | 1050794 A | 11/2000 |

(Continued)

OTHER PUBLICATIONS

Ardissono, L. et al., User Modeling and Recommendation Techniques for Personalized Electronic Program Guides, Personalized Digital Television, Editors: Ardissono, et al., Kluwer Academic Press, 2004 (27 pages).

(Continued)

*Primary Examiner* — Kevin Nguyen
(74) *Attorney, Agent, or Firm* — Wilmer Cutler Pickering Hale and Dorr LLP

(57) ABSTRACT

Methods of and systems for entering ambiguous text input via a linear character selection display are provided. A system for entering an alphanumeric string includes presentation logic for displaying on a presentation device an alphabet arranged into a row of letters and indication logic for presenting visual cues grouping a series of letters of the row into a cluster. The system also includes navigation logic for receiving user actions to move the visual cues along the row of letters to change the letters grouped into the cluster. The visual cues move along the row of letters in variable offsets based on a rate of input of the user actions. The system further includes selection logic for receiving user actions to select the cluster of letters to cause at least one of the letters of the selected cluster to be displayed in a string field.

23 Claims, 8 Drawing Sheets

(56) References Cited

U.S. PATENT DOCUMENTS

| | | | |
|---|---|---|---|
| 4,760,528 A | 7/1988 | Levin | |
| 4,797,855 A | 1/1989 | Duncan, IV et al. | |
| 4,893,238 A | 1/1990 | Venema | |
| 5,224,060 A | 6/1993 | Ma et al. | |
| 5,337,347 A | 8/1994 | Halstead-Nussloch et al. | |
| 5,369,605 A | 11/1994 | Parks | |
| 5,487,616 A | 1/1996 | Ichbiah | |
| 5,532,754 A | 7/1996 | Young et al. | |
| 5,623,406 A | 4/1997 | Ichbiah | |
| 5,635,989 A | 6/1997 | Rothmuller | |
| 5,745,889 A | 4/1998 | Burrows | |
| 5,774,588 A | 6/1998 | Li | |
| 5,805,155 A | 9/1998 | Allibhoy et al. | |
| 5,818,437 A | 10/1998 | Grover et al. | |
| 5,828,420 A | 10/1998 | Marshall et al. | |
| 5,828,991 A | 10/1998 | Skiena et al. | |
| 5,835,087 A | 11/1998 | Herz et al. | |
| 5,859,662 A | 1/1999 | Cragun et al. | |
| 5,880,768 A | 3/1999 | Lemmons et al. | |
| 5,896,444 A | 4/1999 | Perlman et al. | |
| 5,912,664 A | 6/1999 | Eick et al. | |
| 5,930,788 A | 7/1999 | Wical | |
| 5,937,422 A | 8/1999 | Nelson et al. | |
| 5,945,928 A | 8/1999 | Kushler et al. | |
| 5,945,987 A | 8/1999 | Dunn | |
| 5,953,541 A | 9/1999 | King et al. | |
| 6,005,565 A | 12/1999 | Legall et al. | |
| 6,005,597 A | 12/1999 | Barrett et al. | |
| 6,006,225 A | 12/1999 | Bowman et al. | |
| 6,008,799 A | 12/1999 | Van Kleeck | |
| 6,009,459 A | 12/1999 | Belfiore et al. | |
| 6,011,554 A | 1/2000 | King et al. | |
| 6,047,300 A | 4/2000 | Walfish et al. | |
| 6,075,526 A | 6/2000 | Rothmuller | |
| 6,133,909 A | 10/2000 | Schein et al. | |
| 6,184,877 B1 | 2/2001 | Dodson et al. | |
| 6,189,002 B1 | 2/2001 | Roitblat | |
| 6,204,848 B1 | 3/2001 | Nowlan et al. | |
| 6,223,059 B1 | 4/2001 | Haestrup | |
| 6,260,050 B1 | 7/2001 | Yost et al. | |
| 6,266,048 B1 | 7/2001 | Carau, Sr. | |
| 6,266,814 B1 | 7/2001 | Lemmons et al. | |
| 6,269,361 B1 | 7/2001 | Davis et al. | |
| 6,286,064 B1 | 9/2001 | King et al. | |
| 6,307,548 B1 | 10/2001 | Flinchem et al. | |
| 6,307,549 B1 | 10/2001 | King et al. | |
| 6,360,215 B1 | 3/2002 | Judd et al. | |
| 6,377,945 B1 | 4/2002 | Risvik | |
| 6,383,080 B1 | 5/2002 | Link et al. | |
| 6,392,640 B1* | 5/2002 | Will | 345/184 |
| 6,438,751 B1 | 8/2002 | Voyticky et al. | |
| 6,463,586 B1 | 10/2002 | Jerding | |
| 6,466,933 B1 | 10/2002 | Huang et al. | |
| 6,529,903 B2 | 3/2003 | Smith | |
| 6,543,052 B1 | 4/2003 | Ogasawara | |
| 6,564,213 B1 | 5/2003 | Ortega et al. | |
| 6,564,313 B1 | 5/2003 | Kashyap | |
| 6,594,657 B1 | 7/2003 | Livowsky et al. | |
| 6,600,496 B1 | 7/2003 | Wagner et al. | |
| 6,614,422 B1 | 9/2003 | Rafii et al. | |
| 6,614,455 B1 | 9/2003 | Cuijpers et al. | |
| 6,615,248 B1 | 9/2003 | Smith | |
| 6,622,148 B1 | 9/2003 | Noble et al. | |
| 6,631,496 B1 | 10/2003 | Li et al. | |
| 6,664,980 B2 | 12/2003 | Bryan et al. | |
| 6,708,148 B2 | 3/2004 | Gschwendtner et al. | |
| 6,708,336 B1 | 3/2004 | Bruette | |
| 6,721,954 B1 | 4/2004 | Nickum | |
| 6,732,369 B1 | 5/2004 | Schein et al. | |
| 6,734,881 B1 | 5/2004 | Will | |
| 6,757,906 B1 | 6/2004 | Look et al. | |
| 6,766,526 B1 | 7/2004 | Ellis | |
| 6,772,147 B2 | 8/2004 | Wang | |
| 6,785,671 B1 | 8/2004 | Bailey et al. | |
| 6,801,909 B2 | 10/2004 | Delgado et al. | |
| 6,832,350 B1 | 12/2004 | Bates et al. | |
| 6,835,602 B2 | 12/2004 | Norskov et al. | |
| 6,839,702 B1 | 1/2005 | Patel et al. | |
| 6,839,705 B1 | 1/2005 | Grooters | |
| 6,850,693 B2 | 2/2005 | Young et al. | |
| 6,865,575 B1 | 3/2005 | Smith | |
| 6,865,746 B1 | 3/2005 | Herrington et al. | |
| 6,907,273 B1 | 6/2005 | Smethers | |
| 6,957,397 B1 | 10/2005 | Hawkins et al. | |
| 6,965,374 B2 | 11/2005 | Villet et al. | |
| 6,999,959 B1 | 2/2006 | Lawrence et al. | |
| 7,013,304 B1 | 3/2006 | Schuetze et al. | |
| 7,117,207 B1 | 10/2006 | Kerschberg et al. | |
| 7,136,854 B2 | 11/2006 | Smith | |
| 7,149,983 B1 | 12/2006 | Robertson et al. | |
| 7,158,971 B1 | 1/2007 | Bascom | |
| 7,213,256 B1 | 5/2007 | Kikinis | |
| 7,225,180 B2 | 5/2007 | Donaldson et al. | |
| 7,225,184 B2 | 5/2007 | Carrasco et al. | |
| 7,225,455 B2 | 5/2007 | Bennington et al. | |
| 7,269,548 B2 | 9/2007 | Fux et al. | |
| 7,293,231 B1 | 11/2007 | Gunn et al. | |
| 7,461,061 B2 | 12/2008 | Aravamudan et al. | |
| 7,509,313 B2 | 3/2009 | Colledge et al. | |
| 7,529,744 B1 | 5/2009 | Srivastava et al. | |
| 7,536,384 B2 | 5/2009 | Venkataraman et al. | |
| 7,539,676 B2 | 5/2009 | Aravamudan et al. | |
| 7,548,915 B2 | 6/2009 | Ramer et al. | |
| 7,644,054 B2 | 1/2010 | Garg et al. | |
| 7,657,526 B2 | 2/2010 | Aravamudan et al. | |
| 7,679,534 B2 | 3/2010 | Kay et al. | |
| 7,683,886 B2 | 3/2010 | Willey | |
| 7,712,053 B2 | 5/2010 | Bradford et al. | |
| 7,737,999 B2 | 6/2010 | Ardhanari et al. | |
| 7,779,011 B2 | 8/2010 | Venkataraman et al. | |
| 7,788,266 B2 | 8/2010 | Venkataraman et al. | |
| 2002/0002550 A1 | 1/2002 | Berman | |
| 2002/0042791 A1 | 4/2002 | Smith et al. | |
| 2002/0049752 A1 | 4/2002 | Bowman et al. | |
| 2002/0052873 A1 | 5/2002 | Delgado et al. | |
| 2002/0059066 A1 | 5/2002 | O'Hagan | |
| 2002/0059621 A1 | 5/2002 | Thomas et al. | |
| 2002/0077143 A1 | 6/2002 | Sharif et al. | |
| 2002/0083448 A1 | 6/2002 | Johnson | |
| 2002/0133481 A1 | 9/2002 | Smith et al. | |
| 2002/0184373 A1 | 12/2002 | Maes | |
| 2002/0188488 A1 | 12/2002 | Hinkle | |
| 2002/0199194 A1 | 12/2002 | Ali | |
| 2003/0005452 A1 | 1/2003 | Rodriguez | |
| 2003/0005462 A1 | 1/2003 | Broadus et al. | |
| 2003/0011573 A1* | 1/2003 | Villet et al. | 345/169 |
| 2003/0014753 A1 | 1/2003 | Beach et al. | |
| 2003/0023976 A1 | 1/2003 | Kamen et al. | |
| 2003/0033292 A1 | 2/2003 | Meisel et al. | |
| 2003/0037043 A1 | 2/2003 | Chang et al. | |
| 2003/0046698 A1 | 3/2003 | Kamen et al. | |
| 2003/0066079 A1 | 4/2003 | Suga | |
| 2003/0067495 A1 | 4/2003 | Pu et al. | |
| 2003/0084270 A1 | 5/2003 | Coon et al. | |
| 2003/0097661 A1 | 5/2003 | Li et al. | |
| 2003/0226146 A1 | 12/2003 | Thurston et al. | |
| 2003/0237096 A1 | 12/2003 | Barrett et al. | |
| 2004/0021691 A1 | 2/2004 | Dostie et al. | |
| 2004/0046744 A1* | 3/2004 | Rafii et al. | 345/168 |
| 2004/0049783 A1 | 3/2004 | Lemmons et al. | |
| 2004/0073432 A1 | 4/2004 | Stone | |
| 2004/0073926 A1 | 4/2004 | Nakamura et al. | |
| 2004/0078815 A1 | 4/2004 | Lemmons et al. | |
| 2004/0078816 A1 | 4/2004 | Johnson | |
| 2004/0078820 A1 | 4/2004 | Nickum | |
| 2004/0083198 A1 | 4/2004 | Bradford et al. | |
| 2004/0093616 A1 | 5/2004 | Johnson | |
| 2004/0111745 A1 | 6/2004 | Schein et al. | |
| 2004/0128686 A1 | 7/2004 | Boyer et al. | |
| 2004/0139091 A1 | 7/2004 | Shin | |
| 2004/0143569 A1 | 7/2004 | Gross et al. | |
| 2004/0155908 A1 | 8/2004 | Wagner | |
| 2004/0194141 A1 | 9/2004 | Sanders | |
| 2004/0216160 A1 | 10/2004 | Lemmons et al. | |

(56) References Cited

U.S. PATENT DOCUMENTS

| | | |
|---|---|---|
| 2004/0220926 A1 | 11/2004 | Lamkin et al. |
| 2004/0221308 A1 | 11/2004 | Cuttner et al. |
| 2004/0261021 A1 | 12/2004 | Mittal et al. |
| 2005/0015366 A1 | 1/2005 | Carrasco et al. |
| 2005/0038702 A1 | 2/2005 | Merriman et al. |
| 2005/0071874 A1 | 3/2005 | Elcock et al. |
| 2005/0079895 A1 | 4/2005 | Kalenius et al. |
| 2005/0086234 A1 | 4/2005 | Tosey |
| 2005/0086691 A1 | 4/2005 | Dudkiewicz et al. |
| 2005/0086692 A1 | 4/2005 | Dudkiewicz et al. |
| 2005/0129199 A1 | 6/2005 | Abe |
| 2005/0174333 A1 | 8/2005 | Robinson et al. |
| 2005/0192944 A1 | 9/2005 | Flinchem |
| 2005/0193348 A1 | 9/2005 | Nunez et al. |
| 2005/0210020 A1 | 9/2005 | Gunn et al. |
| 2005/0210383 A1 | 9/2005 | Cucerzan et al. |
| 2005/0210402 A1 | 9/2005 | Gunn et al. |
| 2005/0223308 A1 | 10/2005 | Gunn et al. |
| 2005/0240580 A1 | 10/2005 | Zamir et al. |
| 2005/0246311 A1 | 11/2005 | Whelan et al. |
| 2005/0246324 A1 | 11/2005 | Paalasmaa et al. |
| 2005/0278175 A1 | 12/2005 | Hyvonen |
| 2005/0283468 A1 | 12/2005 | Kamvar et al. |
| 2006/0010477 A1 | 1/2006 | Yu |
| 2006/0013487 A1 | 1/2006 | Longe et al. |
| 2006/0015906 A1 | 1/2006 | Boyer et al. |
| 2006/0036640 A1 | 2/2006 | Tateno et al. |
| 2006/0044277 A1 | 3/2006 | Fux et al. |
| 2006/0059044 A1 | 3/2006 | Chan et al. |
| 2006/0069616 A1 | 3/2006 | Bau |
| 2006/0075429 A1 | 4/2006 | Istvan et al. |
| 2006/0090182 A1 | 4/2006 | Horowitz et al. |
| 2006/0090185 A1 | 4/2006 | Zito et al. |
| 2006/0098899 A1* | 5/2006 | King et al. ................... 382/305 |
| 2006/0101499 A1 | 5/2006 | Aravamudan et al. |
| 2006/0101503 A1 | 5/2006 | Venkataraman et al. |
| 2006/0101504 A1 | 5/2006 | Aravamudan et al. |
| 2006/0112162 A1 | 5/2006 | Marot et al. |
| 2006/0117019 A1 | 6/2006 | Sylthe et al. |
| 2006/0136379 A1 | 6/2006 | Marino et al. |
| 2006/0136739 A1 | 6/2006 | Brock et al. |
| 2006/0156233 A1 | 7/2006 | Nurmi |
| 2006/0161520 A1 | 7/2006 | Brewer et al. |
| 2006/0163337 A1 | 7/2006 | Unruh |
| 2006/0167676 A1 | 7/2006 | Plumb |
| 2006/0167859 A1 | 7/2006 | Verbeck Sibley et al. |
| 2006/0173818 A1 | 8/2006 | Berstis et al. |
| 2006/0176283 A1 | 8/2006 | Suraqui |
| 2006/0190308 A1 | 8/2006 | Janssens et al. |
| 2006/0195435 A1 | 8/2006 | Laird-McConnell et al. |
| 2006/0206454 A1 | 9/2006 | Forstall et al. |
| 2006/0206815 A1 | 9/2006 | Pathiyal et al. |
| 2006/0242607 A1 | 10/2006 | Hudson |
| 2006/0248078 A1 | 11/2006 | Gross et al. |
| 2006/0256078 A1 | 11/2006 | Flinchem et al. |
| 2006/0259479 A1 | 11/2006 | Dai |
| 2006/0265653 A1 | 11/2006 | Paasonen et al. |
| 2006/0274051 A1 | 12/2006 | Longe et al. |
| 2007/0005563 A1 | 1/2007 | Aravamudan et al. |
| 2007/0016476 A1 | 1/2007 | Hoffberg et al. |
| 2007/0016862 A1 | 1/2007 | Kuzmin |
| 2007/0027852 A1 | 2/2007 | Howard et al. |
| 2007/0043750 A1 | 2/2007 | Dingle |
| 2007/0050337 A1 | 3/2007 | Venkataraman et al. |
| 2007/0050348 A1 | 3/2007 | Aharoni et al. |
| 2007/0061244 A1 | 3/2007 | Ramer et al. |
| 2007/0061317 A1 | 3/2007 | Ramer et al. |
| 2007/0061321 A1 | 3/2007 | Venkataraman et al. |
| 2007/0061753 A1 | 3/2007 | Ng et al. |
| 2007/0061754 A1 | 3/2007 | Ardhanari et al. |
| 2007/0067272 A1 | 3/2007 | Flynt et al. |
| 2007/0074131 A1 | 3/2007 | Assadollahi |
| 2007/0088681 A1 | 4/2007 | Aravamudan et al. |
| 2007/0094024 A1 | 4/2007 | Kristensson et al. |
| 2007/0100650 A1 | 5/2007 | Ramer et al. |
| 2007/0130128 A1 | 6/2007 | Garg et al. |
| 2007/0143567 A1 | 6/2007 | Gorobets |
| 2007/0150606 A1 | 6/2007 | Flinchem et al. |
| 2007/0182595 A1 | 8/2007 | Ghasabian |
| 2007/0219984 A1 | 9/2007 | Aravamudan et al. |
| 2007/0219985 A1 | 9/2007 | Aravamudan et al. |
| 2007/0226649 A1 | 9/2007 | Agmon |
| 2007/0240045 A1 | 10/2007 | Fux et al. |
| 2007/0255693 A1 | 11/2007 | Ramaswamy et al. |
| 2007/0260703 A1 | 11/2007 | Ardhanari et al. |
| 2007/0266021 A1 | 11/2007 | Aravamudan et al. |
| 2007/0266026 A1 | 11/2007 | Aravamudan et al. |
| 2007/0266406 A1 | 11/2007 | Aravamudan et al. |
| 2007/0271205 A1 | 11/2007 | Aravamudan et al. |
| 2007/0276773 A1 | 11/2007 | Aravamudan et al. |
| 2007/0276821 A1 | 11/2007 | Aravamudan et al. |
| 2007/0276859 A1 | 11/2007 | Aravamudan et al. |
| 2007/0288457 A1 | 12/2007 | Aravamudan et al. |
| 2008/0007570 A1 | 1/2008 | Wessel et al. |
| 2008/0065617 A1 | 3/2008 | Burke et al. |
| 2008/0071771 A1 | 3/2008 | Venkataraman et al. |
| 2008/0077577 A1 | 3/2008 | Byrne et al. |
| 2008/0086704 A1 | 4/2008 | Aravamudan |
| 2008/0114743 A1 | 5/2008 | Venkataraman et al. |
| 2008/0177717 A1 | 7/2008 | Kumar et al. |
| 2008/0195601 A1 | 8/2008 | Ntoulas et al. |
| 2008/0209229 A1 | 8/2008 | Ramakrishnan et al. |
| 2008/0313564 A1 | 12/2008 | Barve et al. |
| 2008/0313574 A1 | 12/2008 | Aravamudan et al. |
| 2009/0077496 A1 | 3/2009 | Aravamudan et al. |
| 2009/0198688 A1 | 8/2009 | Venkataraman et al. |
| 2010/0121845 A1 | 5/2010 | Aravamudan et al. |
| 2010/0153380 A1 | 6/2010 | Garg et al. |
| 2010/0186038 A1 | 7/2010 | Thomas et al. |
| 2010/0306691 A1 | 12/2010 | Ardhanari et al. |

FOREIGN PATENT DOCUMENTS

| | | |
|---|---|---|
| EP | 1143691 | 10/2001 |
| EP | 1338967 A2 | 8/2003 |
| EP | 1463307 A2 | 9/2004 |
| EP | 1622054 | 2/2006 |
| WO | WO-9856173 | 12/1998 |
| WO | WO-0070505 | 11/2000 |
| WO | WO-2004010326 | 1/2004 |
| WO | WO-2004/031931 A1 | 4/2004 |
| WO | WO-2005/033967 | 4/2005 |
| WO | WO-2005/084235 A2 | 9/2005 |
| WO | WO-2005084235 | 9/2005 |
| WO | WO-2006052959 | 5/2006 |
| WO | WO-2006052966 | 5/2006 |
| WO | WO-2007025119 | 3/2007 |
| WO | WO-2007025148 | 3/2007 |
| WO | WO-2007025149 | 3/2007 |
| WO | WO-2007062035 | 5/2007 |
| WO | WO-2007118038 | 10/2007 |
| WO | WO-2007124429 | 11/2007 |
| WO | WO-2007124436 A2 | 11/2007 |
| WO | WO-2007131058 | 11/2007 |
| WO | WO-2008034057 | 3/2008 |
| WO | WO-2008045690 | 4/2008 |
| WO | WO-2008091941 | 7/2008 |
| WO | WO-2008147813 | 12/2008 |
| WO | WO-2008148009 | 12/2008 |
| WO | WO-2008148012 | 12/2008 |

OTHER PUBLICATIONS

Dalianis, "Improving search engine retrieval using a compound splitter for Swedish," Abstract of presentation at Nodalida 2005—15th Nordic Conference on Computational Linguistics, Joensuu Finland, May 21-22, 2005. Retrieved Jan. 5, 2006 from http://phon.joensuu.fi/nodalida/abstracts/03.shtml, 3 pages.

Digital Video Broadcasting, http://www.dvb.org (Oct. 12, 2007) (2 pages).

European Supplemental Search Report for PCT/US2005040415, dated Aug. 11, 2009, 15 pages.

(56) References Cited

OTHER PUBLICATIONS

Gadd, Phonix: The Algorith, Program, vol. 24(4), Oct. 1990 (pp. 363-369).

Good, N. et al., Combining Collaborative Filtering with Personal Agents for Better Recommendations, in Proc. of the 16th National Conference on Artificial Intelligence, pp. 439-446, Orlando, Florida, Jul. 18-22, 1999.

International Search Report and Written Opinion of the International Searching Authority of the United States Patent and Trademark Office for PCT/US2005/040415, dated Nov. 27, 2006, 6 pages.

International Search Report and Written Opinion of the International Searching Authority of the United States Patent and Trademark Office for PCT/US2006/033257, dated Mar. 26, 2008, 6 pages.

International Search Report and Written Opinion of the International Searching Authority of the United States Patent and Trademark Office for PCT/US2006/045053, dated Jul. 24, 2008, 10 pages.

International Search Report and Written Opinion of the International Searching Authority of the United States Patent and Trademark Office for PCT/US2006/33258, dated Mar. 26, 2008, 6 pages.

International Search Report and Written Opinion of the International Searching Authority of the United States Patent and Trademark Office for PCT/US2007/067114, dated Jul. 2, 2008, 6 pages.

International Search Report and Written Opinion of the International Searching Authority of the United States Patent and Trademark Office for PCT/US2007/068064, 9 pages.

International Search Report and Written Opinion of the International Searching Authority of the United States Patent and Trademark Office for PCT/US2007/078490, 6 pages.

International Search Report and Written Opinion of the International Searching Authority of the United States Patent and Trademark Office for PCT/US2008/051789, dated Jul. 14, 2008, 7 pages.

International Search Report and Written Opinion of the International Searching Authority of the United States Patent and Trademark Office for PCT/US2008/064730, dated Sep. 8, 2008, 5 pages.

International Search Report and Written Opinion of the International Searching Authority, the United States Patent and Trademark Office, for International Application No. PCT/US2006/033204, mailing date of Sep. 21, 2007, 5 pages.

International Search Report and Written Opinion of the International Searching Authority, the United States Patent and Trademark Office, for International Application No. PCT/US2008/064365, mailing date of Sep. 3, 2008, 4 pages.

International Search Report and Written Opinion of the International Searching Authority, the United States Patent and Trademark Office, for International Application No. PCT/US2008/064724, mailing date of Sep. 8, 2008, 5 pages.

International Search Report and Written Opinion of the International Searching Authority, the United States Patent and Trademark Office, for PCT/US2005/40424, mailing date of Nov. 21, 2006, 6 pages.

International Search Report, International Application No. PCT/US06/25249, mailed Jan. 29, 2008 (2 pages).

International Search Report, International Application No. PCT/US06/40005, mailed Jul. 3, 2007 (4 Pages).

International Search Report, International Application No. PCT/US07/65703, mailed Jan. 25, 2008 (2 pages).

International Search Report, International Application No. PCT/US07/67100, mailed Mar. 7, 2008 (2 pages).

International Search Report, International Application No. PCT/US07/79729, mailed Apr. 10, 2008 (2 pages).

MacKenzie et al., LetterWise: Prefix-based disambiguation for mobile text input, Proceedings of the ACM Symposium on User Interface Software and Technology—UIST2001, pp. 111-120.

Matthom, "Text Highlighting in Search Results", Jul. 22, 2005. Available at www.matthom.com/archive/2005/07/22/text-highlighting-in-search-results; retrieved Jun. 23, 2006. (4 pages).

Mokotoff, Soundexing and Genealogy, Available at http://www.avotaynu.com/soundex.html, retrieved Mar. 19, 2008, last updated Sep. 8, 2007 (6 pages).

Nardi, et al., "Integrating Communication and Information Through Contact Map," Communications of the ACM, vol. 45, No. 4, Apr. 2002, 7 pages, retrieved from URL:http://portal.acm.org/citation.cfm?id+505251.

Press Release from Tegic Communications, Tegic Communications is awarded patent for Japanese T9(R) text input software from the Japan Patent Office, Oct. 12, 2004. Retrieved Nov. 18, 2005 from http://www.tegic.com/press_view.html?release_num=55254242 (4 pages).

Review of Personalization Technologies: Collaborative Filtering vs. ChoiceStream's Attributized Bayesian Choice Modeling, Technology Brief, ChoiceStream Technologies, Cambridge, MA, Feb. 2004, 13 pages.

Roe, et al., "Mapping UML Models Incorporating OCL Constraints into Object-Z," Technical Report, Sep. 2003, Department of Computing, Imperial College London, retrieved on Jul. 12, 2007, retrieved from the internet: <URL: http://www.doc.ic.ac.uk/-ar3/TechnicalReport2003_9.pdf>, 17 pages.

Silfverberg et al., Predicting text entry speed on mobile phones, Proceedings of the ACM Conference on Human Factors in Computing System—Chi, 2000. pp. 1-16.

Supplemental European Search Report for 06838179.7 dated Dec. 9, 2009, 7 pages.

Supplemental European Search Report for EP07761026.9 dated Jan. 28, 2010, 8 pages.

Supplemental European Search Report for PCT/US2005040424, dated Aug. 20, 2009, 13 pages.

Supplementary European Search Report and Written Opinion for EP07842499, dated Aug. 25, 2010, 6 pages.

Talbot, David. "Soul of a New Mobile Machine." *Technology Review: The Design Issue* May/Jun. 2007. (pp. 46-53).

Turski, et al., "Inner Circle—People Centered Email Client," CHI 2005 Conference on Human Factors in Computing Sysems, Apr. 2005, pp. 1845-1848, 4 pages, retrieved from URL:http://portal.acm.org/citation.cfm?id+1056808.1057037.

Wikipedia's entry for Levenshtein distance (n.d.). Retrieved Nov. 15, 2006 from http://en.wikipedia.org/wiki/Levenshtein_distance (9 pages).

* cited by examiner

METHODS AND SYSTEMS FOR A LINEAR CHARACTER SELECTION DISPLAY INTERFACE FOR AMBIGUOUS TEXT INPUT

CROSS-REFERENCE TO RELATED APPLICATIONS

This application is a continuation of U.S. patent application Ser. No. 11/862,917, entitled Methods and Systems for a Linear Character Selection Display Interface for Ambiguous Text Input, filed Sep. 27, 2007, now U.S. Pat. No. 7,925,986, which claims the benefit under 35 U.S.C. §119(e) to U.S. Provisional Patent Application No. 60/828,519, entitled A Linear Character Selection Display Interface For Ambiguous Text Input On Devices Without A Keypad, filed on Oct. 6, 2006, both of which are incorporated by reference herein.

BACKGROUND

1. Field of Invention

The present invention relates to a user-interface and, more specifically, a character selection interface system for entering ambiguous text input on input- and/or display-constrained devices with or without a keypad where character/symbol clusters are linearly rendered on a device display and are navigable in a single dimension.

2. Description of Related Art

Linear text input systems are those that require a user to input each letter of the text by scrolling through a selection of characters and selecting the desired character. Such interfaces are useful on devices that do not have a keypad, or have a constrained input keypad, e.g., iPod devices or car navigation systems. FIG. 1 illustrates one such linear text input system for entering unambiguous text. In FIG. 1, the user has selected "A", followed by "R", and is currently in the process of scrolling through numerals 0-9 and letters A-Z to select the next character in the input string.

Any user of linear text input systems is painfully aware of the overshoot/undershoot problem. Because linear text input systems require the user to scroll through a long list of characters, overshoot tends to occur when user selects characters separated by a relatively large number of characters. For example, a user may rapidly click the navigation buttons or hold the navigation buttons down when moving from one character to the next, where the characters are far apart in the list. However, overshoot can also occur with characters that are close together in the list, as the user may simply click the navigation button too many times, or hold the button down for too long. Undershoot can occur in a similar circumstance, when the user clicks too few times or does not hold the button down long enough to scroll through the appropriate number of characters.

Thus, users tend to slow down and carefully select the item of choice when getting close to the desired item. This increases the amount of time required for a user to enter text. Furthermore, navigation of a linear alphabet for character selection can become cumbersome since the navigation length is on average high. For example, the English alphabet along with numbers would be a list of 36 characters. Text input by navigating to each character becomes extremely cumbersome.

BRIEF SUMMARY OF THE INVENTION

The invention provides methods of and systems for entering ambiguous text input via a linear character selection display.

Under one aspect of the invention, a user-interface system for entering an alphanumeric string includes presentation logic for displaying on a presentation device an alphabet arranged into a row of letters. The presentation logic includes logic to display a string field for presenting an alphanumeric string of characters selected by a user. The system also includes indication logic, cooperative with the presentation logic, for presenting visual cues grouping a series of letters of the row into a cluster of letters to aid in the navigation of the row and the selection of a desired cluster. The system further includes navigation logic, cooperative with the indication logic, for receiving user actions from an input device to move the visual cues along the row of letters to change the letters grouped into the cluster. The visual cues move along the row of letters in variable offsets based on a rate of input of the user actions. The visual cues move by a single offset for each user action in response to user actions entered at or slower than a predetermined rate, and the visual cues move by more than a single offset for each user action in response to user actions entered faster than the predetermined rate. The system includes selection logic for receiving user actions from the input device to select the cluster of letters to cause at least one of the letters of the selected cluster to be displayed in the string field.

Under another aspect of the invention, the system further includes disambiguation logic for receiving the selected cluster and for disambiguating the selection to a probable user letter selection of one of the letters of the selected cluster.

Under a further aspect of the invention, the system further includes disambiguation logic for receiving user actions from the input device to select one of the letters from the selected cluster and for causing the selected letter to be displayed in the string field.

Under yet another aspect of the invention, each letter of the selected cluster is selectable by acting only on the corresponding alphanumeric cluster. A cluster can be selectable via a cluster selection action, and a letter selection action can select one of the letters of the selected cluster.

Under a still further aspect of the invention, the presentation device is separate from the input device so that the user can enter the alphanumeric string while focusing on the presentation device. The presentation device and the input device can be included in the same device.

Under an aspect of the invention, the letters of the row of letters are presented in alphabetical order. The system can also include logic, cooperative with the presentation logic, for displaying a row of numerals adjacent to the row of letters.

Under another aspect of the invention, the cluster includes at least three letters and at least one numeral. The row of letters can include numerals.

Under yet another aspect of the invention, the navigation logic moves the visual cues along the row of letters to change the letters grouped into the cluster from a first subset of the letters to a second subset of the letters, the first and second subsets being contiguous. Under a further aspect of the invention, the navigation logic can move the visual cues along the row of letters to change the letters grouped into the cluster from a first subset of the letters to a second subset of the letters, the first and second subsets being separated by letters not in the first or second cluster.

These and other features will become readily apparent from the following detailed description where embodiments of the invention are shown and described by way of illustration

BRIEF DESCRIPTION OF THE SEVERAL VIEWS OF THE DRAWINGS

For a more complete understanding of various embodiments of the present invention, reference is now made to the following descriptions taken in connection with the accompanying drawings in which.

DETAILED DESCRIPTION

Preferred embodiments of the invention provide a linear character selection interface that enables a user to enter ambiguous text input using only a linear navigation control. The linear character selection interface provides character/symbol clusters that are linearly rendered on a device display and are navigable in a single dimension. The linear character selection interface addresses the drawbacks of linear navigation of an alphabet space by (1) reducing the average distance traversed by clustering the alphabets into groups and (2) providing for the coarse selection of the desired alphabet. These advantages enable the user to avoid the overshoot and undershoot problems described above, and increase the user's speed of text entry. The techniques described herein are particularly useful on input constrained and/or display constrained devices with or without a keypad.

Embodiments of the present invention build on techniques, systems, and methods disclosed in earlier filed applications, including, but not limited to U.S. patent application Ser. No. 11/136,261, filed 24 May 2005, entitled "Method And System For Performing Searches For Television Programming Using Reduced Text Input", U.S. patent application Ser. No. 11/246,432, filed 7 Oct. 2005, entitled "Method And System For Incremental Search With Reduced Text Entry Where The Relevance Of Results Is A Dynamically Computed Function Of User Input Search String Character Count", U.S. patent application Ser. No. 11/312,908, filed 20 Dec. 2005, entitled "Method And System For Dynamically Processing Ambiguous, Reduced Text Search Queries And Highlighting Results Thereof", U.S. patent application Ser. No. 11/235,928, filed 27 Sep. 2005, entitled "Method And System For Processing Ambiguous, Multiterm Search Queries", and U.S. patent application Ser. No. 11/682,693, filed on 6 Mar. 2007, entitled "Methods and Systems For Selecting and Presenting Content Based On Learned Periodicity Of User Content Selections", the contents of all of which are incorporated by reference herein. Those applications taught specific way to perform incremental searches using ambiguous text input and methods of ordering search results. The present techniques, however, are not limited to the systems and methods disclosed in the incorporated patent applications. Thus, while reference to such systems and applications may be helpful, it is not believed necessary to understand the present embodiments or inventions.

Figure 1:
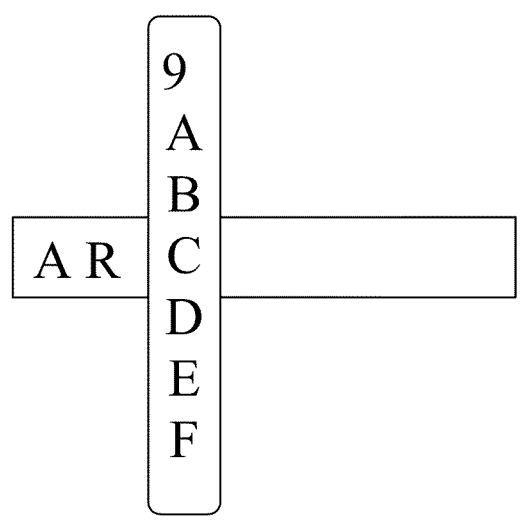
FIG. 1 illustrates a linear text input system.
Figure 2:
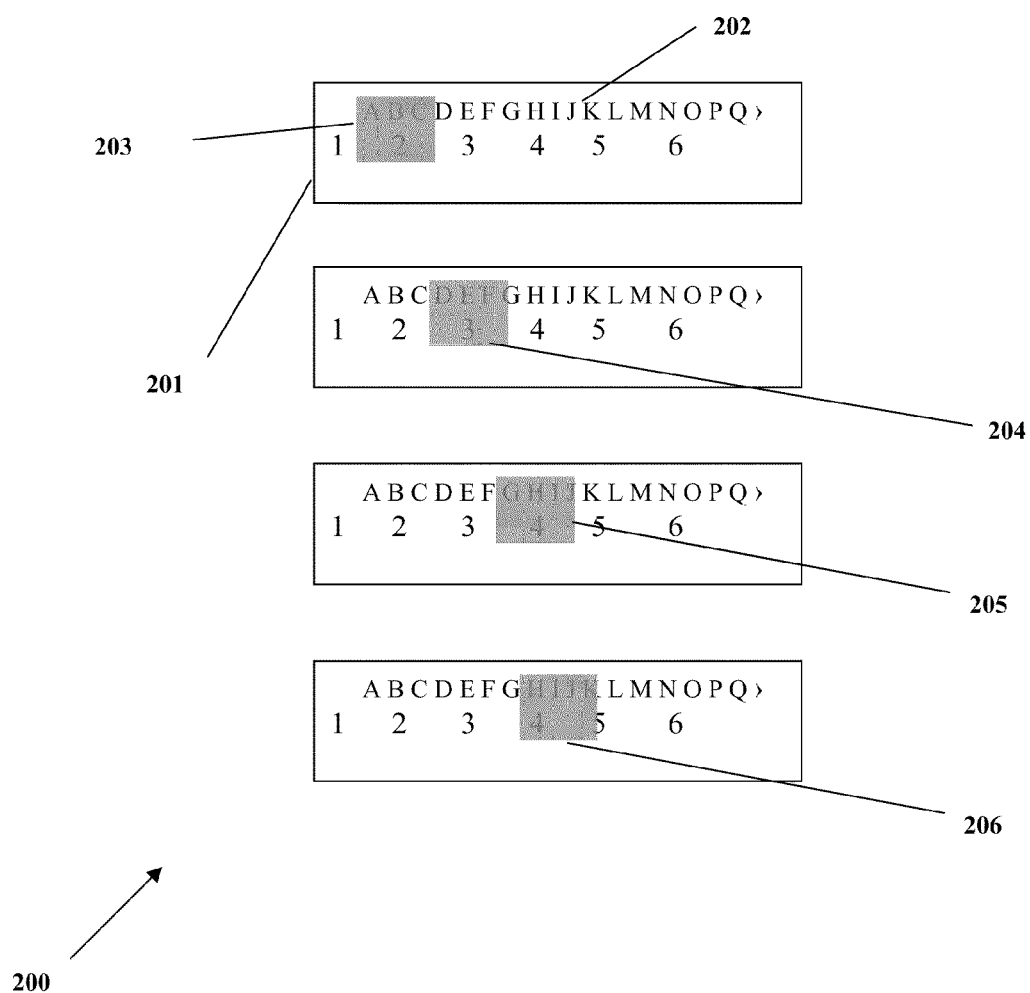
FIG. 2 illustrates a linear character selection interface identifying character clusters.
Figure 3:
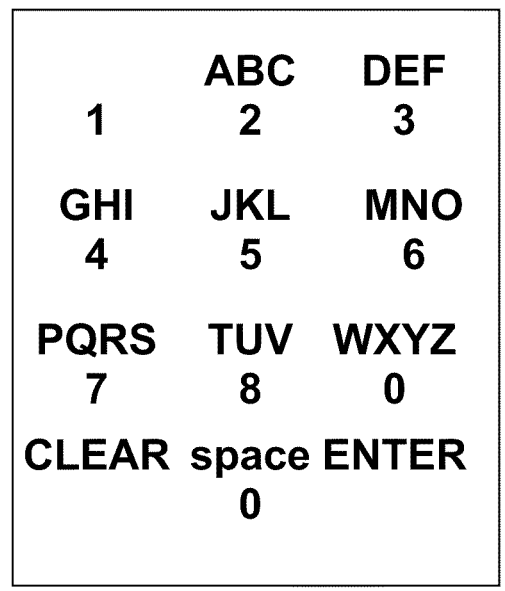
FIG. 3 illustrates a 12-key telephone keypad.

FIG. 2 illustrates an embodiment of a linear character selection interface 200. The interface 200 has a display 201 where a portion of an alphabet 202 is presented. The interface also has a selection highlight 203 indicating that a particular cluster of characters is currently selected. In the embodiment shown in FIG. 2, the alphanumeric clusters correspond to the clustering found on a 12-key phone keypad, such as the one shown in FIG. 3. However, unlike the 12-key phone keypad, the selection highlight 203 expands and contracts dynamically to encompass clusters having different numbers of characters, for example, the "a, b, c, 2" cluster has four characters, while the "w, x, y, z, 9" cluster has five characters. The 12-key phone keypad arrangement is merely an example of one possible arrangement of clusters, and clusters having more or less characters are consistent with embodiments of the invention. Similarly, the number of characters present in a cluster may be dynamic and, for example, may be based on the user's typical speed of navigation. Thus, the selection highlight 203 may increase the number of characters encompassed within the highlight 203 if the user is navigating the linear arrangement at a high rate of speed.

Furthermore, the linear character selection interface 200 provides for the disambiguation of a selected cluster. Therefore, in some implementations, after the user has selected one of the ambiguous clusters, the user can enter the cluster and select among the letters and numbers of the cluster to specify a particular character to be part of the text entry.

In an implementation of the linear character selection interface 200 utilizing ambiguous text input, the systems and/or devices employing the methods disclosed herein can provide for an express word separator character. An express word separator character is one that unambiguously identifies that one ambiguous search term has ended and another has begun. By providing an express word separator, the number of unambiguous search terms that can match the ambiguous input is reduced. Whereas, if an ambiguous character is used to represent a word separator, a text entry intended by the user to be a multiple term entry can be interpreted by a disambiguation system to be a single search term, thereby causing the search system to return results not of interest to the user. In addition, because the number of possible unambiguous search terms matching the ambiguous input is increased, the processing load on the system is increased, which can result in reduced system performance. Once an ambiguous text input has been supplied, ambiguous search techniques, such as those in the incorporated applications, can be used to retrieve search results.

Figure 4:
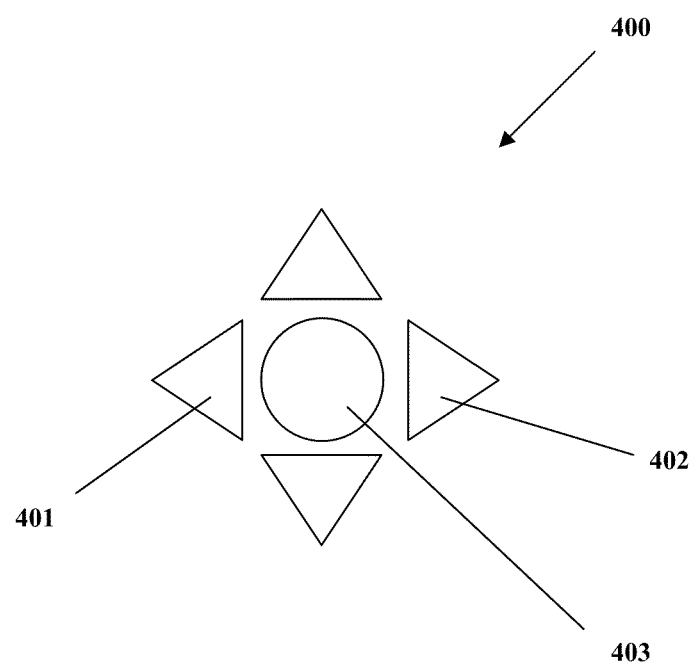
FIG. 4 illustrates a five-button navigation interface.
Figure 5:
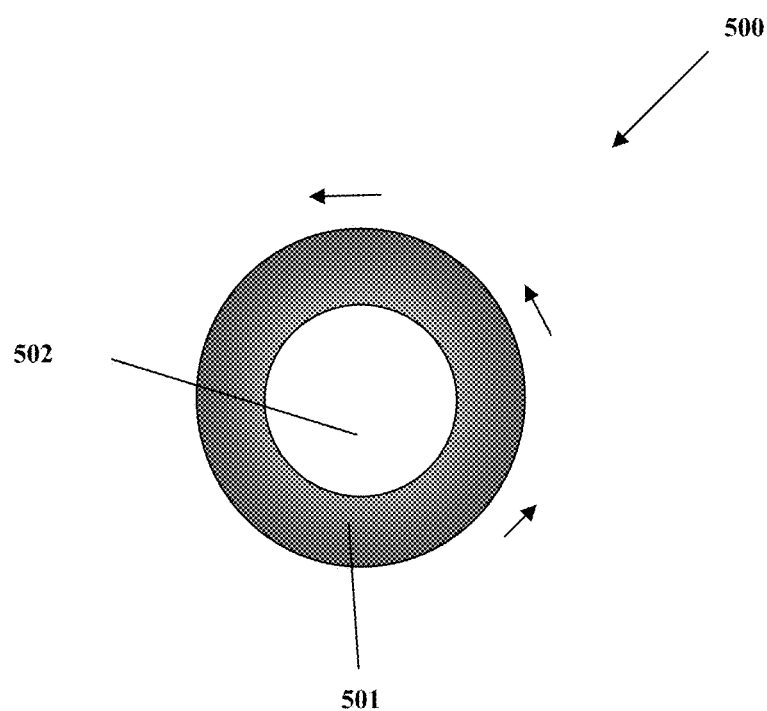
FIG. 5 illustrates a touch sensitive circular scroll pad navigation interface.

Navigation of the character clusters can be accomplished through a variety of interfaces. FIGS. 4 and 5 illustrate a five-button navigation interface 400 and a circular scroll pad 500, respectively. The five-button interface 400 and scroll pad 500 are two examples of physical interfaces that can be used with the linear character selection interface 200 of FIG. 2. For example, two opposing navigation buttons 401, 402 of the five-button navigation interface 400 is used to manipulate the selection highlight 203 of FIG. 2 left and right through the linear character list. Meanwhile a central selection button 403 is used to select the highlighted character cluster. Thus, the linear character selection interface 200 enables the user to quickly enter ambiguous text input, which can be used to render nonambiguous text input or produce search results using the techniques disclosed in the incorporated applications. Similarly, the user can slide the selection highlight 203 left and right by contacting a circular track 501 of the scroll pad 500 in a counterclockwise and clockwise direction, respectively, and a central selection button 502 is used to select the highlighted cluster. Any other form of navigation that can traverse a one-dimensional sequence of character clusters can be used with embodiments of the invention.

When the user's navigation pace exceeds a certain threshold, the selection highlight 203 moves in discrete steps of the alphanumeric clusters. The user's navigation pace can be determined by measuring the amount of time between sequent browse action inputs. For example, if the user uses a fast circular browse motion on the scroll pad 500, or does a press-and-hold or quickly clicks the left or right buttons of the five-button interface 400, the selection highlight 203 of FIG. 2 moves at the cluster boundaries 204 and 205. This method enables user to quickly get to the character of interest. When the character of interest is anywhere within the selection highlight 203, the user selects the highlighted alphabet cluster. As described above, the user input is ambiguous input containing all the characters displayed within the selection highlight or a symbol indicative of the alphanumeric cluster.

When the user's navigation pace falls below a certain threshold, the selection highlight 203 navigates the alphabet clusters such that one letter enters the selection highlight 203 as one letter leaves. For example, as shown in FIG. 2, when the user navigates relatively slowly, the selection highlight 203 moves from position 205 to position 206. Numbers may enter and leave depending on the position of the selection highlight 203. Alternatively, numbers may be placed at the beginning or end of the list of letters and form additional clusters. This movement of the selection highlight 203 reduces the likelihood of the user overshooting the desired character. This is so because the selection highlight 203 spans multiple alphabets, thus, for a cluster having three letters, a horizontal positioning error of one on each side of the desired letter is tolerated. The clustering both enables fast navigation and easy selection of the desired character.

Changes in the user's navigation pace can change whether the selection highlight 203 moves according to the fast or slow techniques described above. In other words, if the user's navigation pace accelerates, the selection highlight 203 will transition from adding a single letter at a time to a cluster-by-cluster navigation style. Also, if the user decelerates his or her navigation pace, the selection highlight 203 will transition from the cluster-by-cluster style to the letter-by-letter style.

In another implementation, instead of moving at either the fast-pace style or the slow-pace style, the number of letters added to the selection highlight 203 can vary continuously depending upon the user's navigation pace. Thus, at a relatively slow pace of navigation, the selection highlight 203 would move the letter-by-letter, as described above. As the user increases his or her pace of navigation, more letters would be added and removed with each navigation action. Finally, above a maximum threshold value, the selection highlight 203 would move cluster-by-cluster, as described above.

In yet another implementation, the selection highlight 203 can move cluster-by-cluster similar to that described above. However, the clusters are not contiguous. Thus, for a relatively high navigation pace, the system moves the selection highlight 203 from one cluster to another cluster by skipping adjacent letters. For example, referring to FIG. 2, for a high navigation rate, the system could move the selection highlight 203 from the cluster with cluster boundaries 204 to the cluster with cluster boundaries 206, thereby skipping the letter "G". More than one letter could be skipped, depending upon the navigation rate.

The navigation pace thresholds can be determined empirically based on user preference. In addition, the navigation pace thresholds can be configurable by the particular user on his or her device.

In an alternative implementation of the linear character selection interface, the user's speed of navigation does not change how the selection highlight 203 moves. In such an implementation, the selection highlight always moves according to the clusters of letters and/or numbers, as described above for the fast pace navigation or always moves one letter at a time, as described above for the slow pace navigation.

The linear character selection interface described herein reduces the amount of linear navigation the user must perform for text input on a device. The selection highlight, which has multiple characters highlighted at any time, requires the user only get the character of interest within the selection highlight window, as opposed to accurately selecting just one character. This reduces the effort of navigation and character selection and increases the speed with which the user can enter text.

Figure 6:
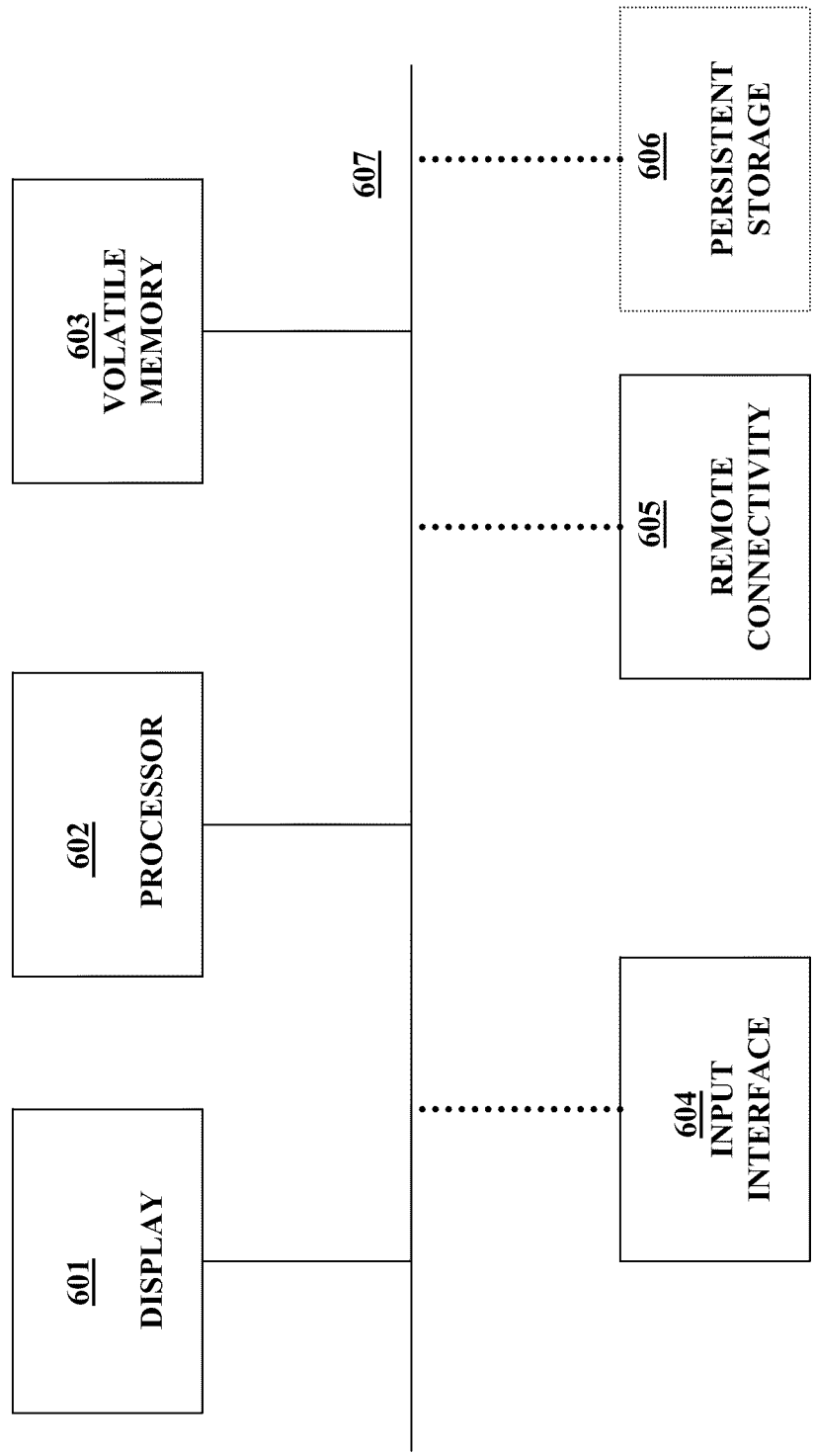
FIG. 6 illustrates one configuration of a device for use with the linear character selection interface.

FIG. 6 illustrates a configuration for an input and/or display constrained device utilizing the linear character selection interface described herein. For example, the device could be a remote control coupled with a television system a portable music player. The device has a display 601 and an input interface 604. The input interface can be the five-button navigation interface 400, described above, for navigation and/or circular scroll pad 500. Such a device can have a processor 602 and can have remote connectivity (for example, a remote control IR) 605. The device can also have persistent storage 606, on which could reside a text composition or a search application, which is loaded into volatile memory 603 for execution using the device bus 607. A remote control can communicate with a television via the remote connectivity 605 and the linear character selection interface would be rendered on the television display. In the case of the music player device, the linear character selection interface would be rendered on the device display 601 itself. The remote connectivity 605 can also provide a connection to a content system (not shown) for providing content to the device The content search methods found in the incorporated applications are useful for identifying and selecting content based on the search input provided by the linear character selection interface. In one implementation, each content item is associated with one or more descriptive metadata terms. This metadata describes, for example, the types of content items, the information contained in the content items, and keywords associated with the content items. Thus, the incremental input can be compared against the various descriptive terms/metadata to identify content that matches what the user seeks.

Figure 7:
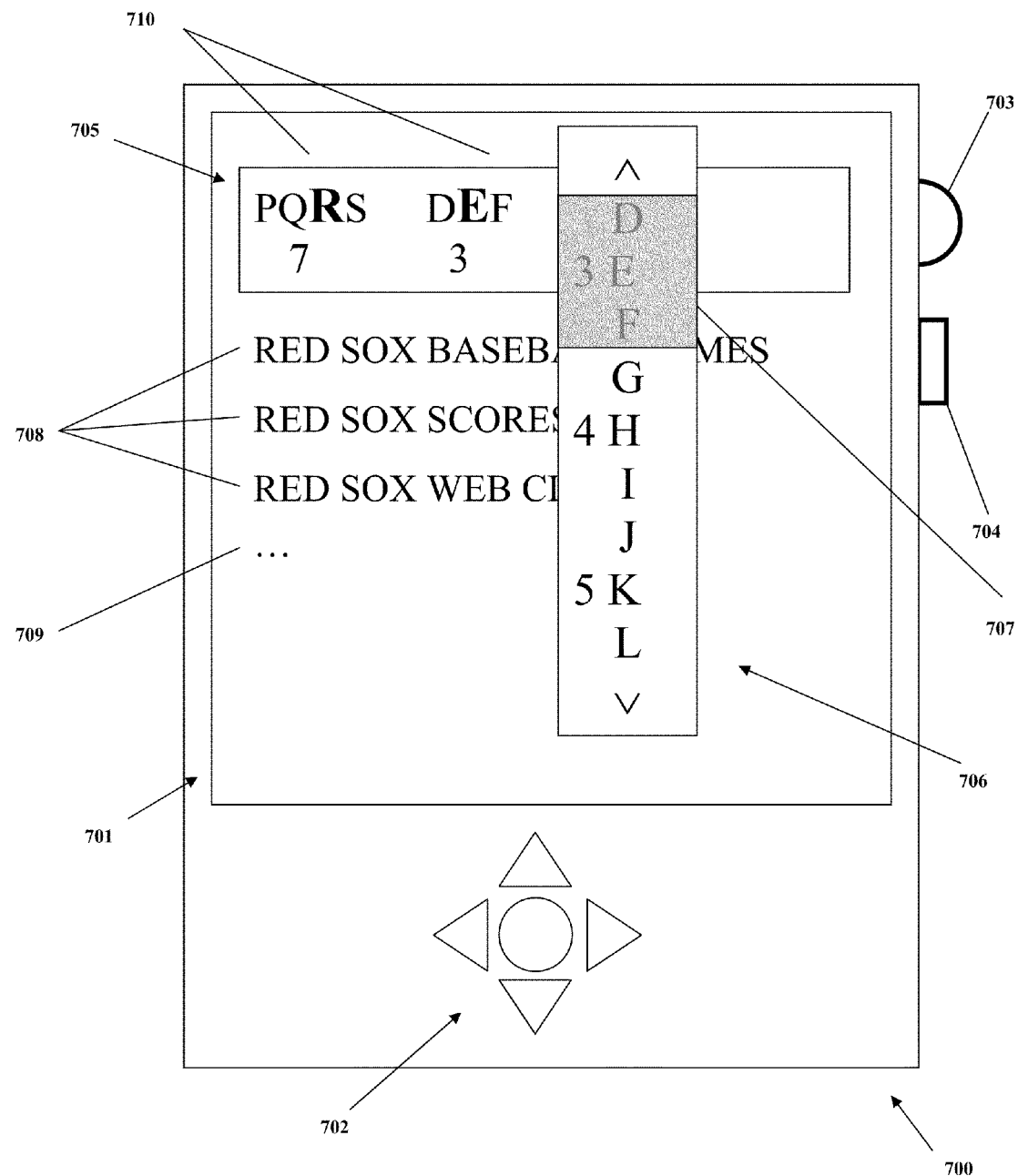
FIG. 7 illustrates an application of an embodiment of the invention implemented on a handheld user device.

FIG. 7 illustrates an application of an embodiment of the invention implemented on a handheld user device 700 (e.g., a mobile telephone, PDA, or handheld computer). The handheld user device 700 has a display area 701, a five-button interface 702, a scroll wheel 703, and an escape button 704. The display area 701 has a query input section 705 for receiving text input supplied by a linear character selection interface 706. As described above, the five-button interface 702 and/or the scroll wheel 703 is used to move a selection highlight 707 back-and-forth along the linear arrangement of alphanumeric symbols to select clusters. In FIG. 7, the user wishes to find content related to the "Red Sox". Thus, the user has selected the clusters "PQRS7" and "DEF3" to represent "RE". In response, the device searches a collection of content items using, for example, the techniques and method disclosed in the incorporated applications. Based on this ambiguous input, the device 700 (and/or a content system in communication with the device) returns content items for "Red Sox" 708. In addition, the device 700 returns other results 709 that have metadata that match the partial prefix "RE", as well as other possible prefixes formed by the letters of the ambiguous clusters 710.

Because one unambiguous prefix of the selected clusters matching the "Red Sox" results is "RE", the device can indicate which letters of the clusters form the prefix "RE". FIG. 7 illustrates this optional feature by showing the "R" and "E" in a larger font and in bold. Other methods can be used to highlight the characters, such as the use of different colors, highlight windows, and the like. The choice of which letters to select from the cluster can be based on the metadata associated with the content item results ranked most highly in the list of search results (e.g., using the ranking techniques discussed in the incorporated applications), or the selection can be based on a currently highlighted search result. In the alternative, rather than displaying the entire cluster of alphanumeric characters in the query input section 705 and highlighting a specific character, the device 700 can display only the specific character forming the search prefix that caused the content items to be listed.

Figure 8:
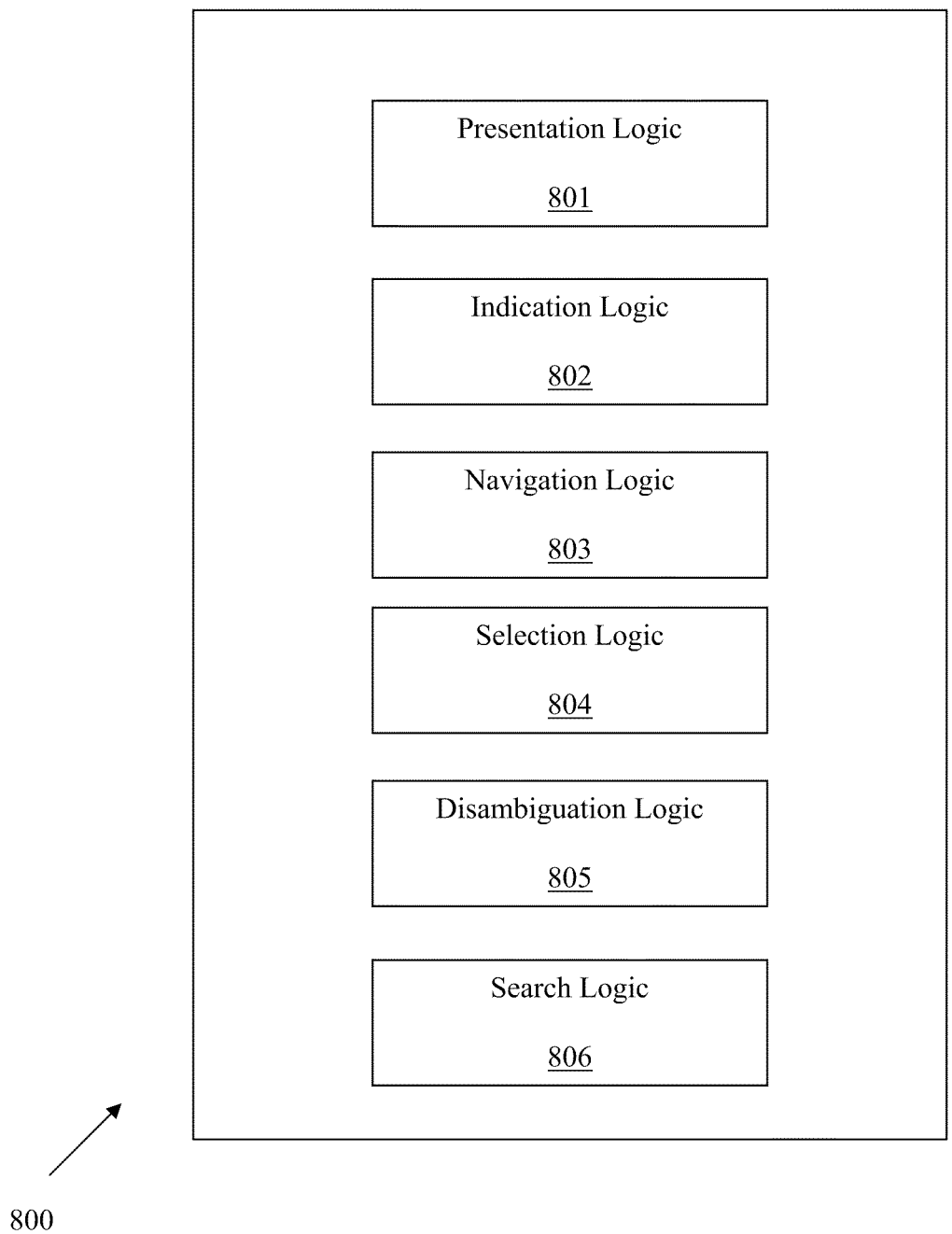
FIG. 8 illustrates a system for entering an ambiguous alphanumeric string.

FIG. 8 illustrates a system 800 for entering an alphanumeric string using the techniques set forth above. The system 800 includes presentation logic 801 for displaying the letters and numerals arranged in a linear configuration (as shown, for example, in linear character selection interface 706 of FIG. 7). The presentation logic 801 can also display the characters and/or character clusters selected by the user. The presentation logic 801 can also display the search results returned based on the search query input supplied by the user.

The system 800 also includes indication logic 802 and navigation logic 803. The indication logic 802 cooperates with the presentation logic 801 to indicate those characters that are currently highlighted by the user's selection. The navigation logic 803 receives navigation inputs from the user for traversing the linear arrangement of characters. The navigation logic 803 cooperates with the indication logic and the presentation logic to determine, according to the user's navigation pace, which letters and numerals are included in the alphanumeric clusters. The navigation logic feeds this information to the indication logic 802 so that the indication logic can highlight particular letters and/or numerals.

The system 800 further includes selection logic 804 to receive selection actions from the user for selecting a particular cluster. The selection logic 804 can optionally also provide a mechanism for selecting a particular letter or numeral within a selected cluster. For example, once a cluster has been selected, the user can indicate a desire to further refine the character selection (e.g., pressing a particular button on the user's device). The selection logic 804 responds by presenting the user with a character-by-character selection interface for only those letters and numerals contained in the selected cluster.

The system 800 also has disambiguation logic 805 and search logic 806. The disambiguation logic 805 receives the ambiguous text input formed by the user's entries and creates unambiguous, or otherwise encoded, query input for use in searching for results. The search logic 806 employs the disambiguated, or otherwise encoded, search input from the disambiguation logic 805 to search a set of content in order to find results matching the query input. The techniques disclosed in the incorporated applications can be used to implement the disambiguation logic 805 and/or search logic 806.

Furthermore, the system 800 can operate as described above without the disambiguation logic 805. The applications incorporated above describe systems and techniques for encoding metadata associated with content items into ambiguous prefixes. For example, the ambiguous search prefixes may be organized into a trie data structure. The system 800 can accept ambiguous input from the user and perform a search of the data structure directly employing the ambiguous input. Thus, referring to FIG. 7, instead of disambiguating the clusters "PQRS7" and "DEF3" into "R" and "E" to match the metadata term "Red Sox", the system 800 can send the sequence of characters that represent the selected clusters, e.g., "73". In this way, the system 800 will match the encoded ambiguous input "73" against any content items or associated metadata similarly encoded into the data structure.

It will be appreciated that the scope of the present invention is not limited to the above-described embodiments, but rather is defined by the appended claims, and these claims will encompass modifications of and improvements to what has been described. For example, the embodiments provided above are described as being useful for performing searches on input and/or display constrained devices. However, the techniques, methods, and systems described and incorporated herein can be implemented to perform incremental text entry independent of searching for content item results.

What is claimed is:

1. A user-interface system for entering an alphanumeric string, the system comprising:

presentation logic for displaying on a presentation device an alphabet arranged into a row of letters, the presentation logic including logic to display a string field for presenting an alphanumeric string of characters selected by a user;

indication logic, cooperative with the presentation logic, for presenting visual cues grouping a series of letters of the row into a cluster of letters to aid in the navigation of the row and the selection of a desired cluster;

navigation logic, cooperative with the indication logic, for receiving user actions from an input device to move the visual cues along the row of letters to change the letters grouped into the cluster, the visual cues moving along the row of letters in variable offsets based on a rate of input of the user actions, wherein the visual cues move by a single offset for each user action in response to user actions entered at or slower than a predetermined rate, and wherein the visual cues move by more than a single offset for each user action in response to user actions entered faster than the predetermined rate; and selection logic for receiving user actions from the input device to select the cluster of letters to cause at least one of the letters of the selected cluster to be displayed in the string field.

2. The system of claim 1, further comprising disambiguation logic for receiving the selected cluster and for disambiguating the selection to a probable user letter selection of one of the letters of the selected cluster.

3. The system of claim 1, further comprising disambiguation logic for receiving user actions from the input device to select one of the letters from the selected cluster and for causing the selected letter to be displayed in the string field.

4. The system of claim 3, wherein each letter of the selected cluster is selectable by acting only on the corresponding alphanumeric cluster.

5. The system of claim 4, wherein a cluster is selectable via a cluster selection action and a letter selection action selects one of the letters of the selected cluster.

6. The system of claim 1, wherein the presentation device is separate from the input device so that the user can enter the alphanumeric string while focusing on the presentation device.

7. The system of claim 1, wherein the presentation device and the input device are included in the same device.

8. The system of claim 1, wherein the letters of the row of letters are presented in alphabetical order.

9. The system of claim 1, further comprising logic, cooperative with the presentation logic, for displaying a row of numerals adjacent to the row of letters.

10. The system of claim 9, wherein the cluster includes at least three letters and at least one numeral.

11. The system of claim 1, wherein the row of letters includes numerals.

12. The system of claim 1, wherein the navigation logic moves the visual cues along the row of letters to change the letters grouped into the cluster from a first subset of the letters to a second subset of the letters, the first and second subsets being separated by letters not in the first or second cluster.

13. A user-interface method for entering an alphanumeric string, the method comprising:
   displaying on a presentation device an alphabet arranged into a row of letters;
   presenting visual cues grouping a series of letters of the row into a cluster of letters to aid in the navigation of the row and the selection of a desired cluster;
   receiving user actions from an input device to move the visual cues along the row of letters to change the letters grouped into the cluster, the visual cues moving along the row of letters in variable offsets based on a rate of input of the user actions, wherein the visual cues move by a single offset for each user action in response to user actions entered at or slower than a predetermined rate, and wherein the visual cues move by more than a single offset for each user action in response to user actions entered faster than the predetermined rate; and
   receiving user actions from the input device to select the cluster of letters to cause at least one of the letters of the selected cluster to be displayed in a string field so that an alphanumeric string of characters selected by a user is presented on the presentation device.

14. The method of claim 13, further comprising receiving the selected cluster and disambiguating the selection to a probable user letter selection of one of the letters of the selected cluster.

15. The method of claim 13, further receiving user actions from the input device to select one of the letters from the selected cluster and causing the selected letter to be displayed in the string field.

16. The method of claim 15, wherein each letter of the selected cluster is selectable by acting only on the corresponding alphanumeric cluster.

17. The method of claim 13, wherein the presentation device is separate from the input device so that the user can enter the alphanumeric string while focusing on the presentation device.

18. The method of claim 13, wherein the presentation device and the input device are included in the same device.

19. The method of claim 13, wherein the letters of the row of letters are presented in alphabetical order.

20. The method of claim 13, further comprising displaying a row of numerals adjacent to the row of letters.

21. The method of claim 20, wherein the cluster includes at least three letters and at least one numeral.

22. The method of claim 13, wherein the row of letters includes numerals.

23. The method of claim 13, wherein the visual cues move along the row of letters to change the letters grouped into the cluster from a first subset of the letters to a second subset of the letters, the first and second subsets being separated by letters not in the first or second cluster.

* * * * *